United States Patent
Yu et al.

(10) Patent No.: US 10,611,648 B2
(45) Date of Patent: Apr. 7, 2020

(54) HYBRID HYDROGEL FOR HIGHLY EFFICIENT SOLAR GENERATION OF STEAM

(71) Applicant: Board of Regents, The University of Texas System, Austin, TX (US)

(72) Inventors: Guihua Yu, Austin, TX (US); Fei Zhao, Austin, TX (US); Xingyi Zhou, Austin, TX (US)

(73) Assignee: Board of Regents, The University of Texas Systems, Austin, TX (US)

( * ) Notice: Subject to any disclaimer, the term of this patent is extended or adjusted under 35 U.S.C. 154(b) by 22 days.

(21) Appl. No.: 15/941,080

(22) Filed: Mar. 30, 2018

(65) Prior Publication Data

US 2018/0327279 A1 Nov. 15, 2018

Related U.S. Application Data

(60) Provisional application No. 62/478,678, filed on Mar. 30, 2017.

(51) Int. Cl.

| | |
|---|---|
| *C02F 1/14* | (2006.01) |
| *B01D 1/00* | (2006.01) |
| *B01D 5/00* | (2006.01) |
| *F24S 90/00* | (2018.01) |
| *F24S 70/10* | (2018.01) |
| *C02F 1/04* | (2006.01) |
| *B01J 20/24* | (2006.01) |
| *B01D 1/22* | (2006.01) |
| *B01J 20/26* | (2006.01) |
| *B01J 20/28* | (2006.01) |
| *F24S 70/14* | (2018.01) |

(Continued)

(52) U.S. Cl.
CPC .............. *C02F 1/14* (2013.01); *B01D 1/0035* (2013.01); *B01D 1/22* (2013.01); *B01D 5/006* (2013.01); *B01D 5/009* (2013.01); *B01J 20/24* (2013.01); *B01J 20/267* (2013.01); *B01J 20/28047* (2013.01); *C02F 1/048* (2013.01); *F24S 70/10* (2018.05); *F24S 70/14* (2018.05); *F24S 90/00* (2018.05); *B01J 2220/445* (2013.01); *B01J 2220/4825* (2013.01); *C02F 2103/08* (2013.01); *F24S 10/80* (2018.05)

(58) Field of Classification Search
CPC ... C02F 1/048; C02F 1/14; F24S 70/14; B01J 20/28047; B01J 20/24; B01J 20/267; B01D 1/0035; B01D 1/22; B01D 5/006; B01D 5/009
See application file for complete search history.

(56) References Cited

U.S. PATENT DOCUMENTS

| | | | | |
|---|---|---|---|---|
| 5,370,825 | A * | 12/1994 | Angelopoulos | G03F 7/038 252/500 |
| 2010/0151580 | A1* | 6/2010 | Peppas | A61K 47/58 436/86 |
| 2013/0278989 | A1* | 10/2013 | Lam | B60J 3/04 359/275 |

OTHER PUBLICATIONS

Lee, K.S. et al. (2005) Applied Physics Letters, 86(7). 074102.*

(Continued)

*Primary Examiner* — Brian A McCaig
(74) *Attorney, Agent, or Firm* — Meunier Carlin & Curfman LLC

(57) ABSTRACT

Disclosed herein are water purifying networks. The networks efficiently absorb water and convert solar irradiation to heat, thereby evaporating absorbed water, which can be collected as purified water.

16 Claims, 7 Drawing Sheets

(51) Int. Cl.
 *C02F 103/08* (2006.01)
 *F24S 10/80* (2018.01)

(56) References Cited

OTHER PUBLICATIONS

Stevens, M.P. (1990) Polymer Chemistry An Introduction, Oxford University Press, 633 pgs (Office action cites p. 134).*
Thakur, M. (1988) Macromolecules, 21, 661-664.*
George Ni, Gabriel Li, Svetlana V. Boriskina, Hongxia Li, Weilin Yang, TieJun Zhang and Gang Chen. "Steam Generation under One Sun Using a Floating Structure with Thermal Concentration", Nature Energy, 1, 16126, 2016, 18 pages.
Bae, K, Kang, G, Cho, SK, Park, W, Kim, K, and Padilla, WJ. "Flexible thin-film black gold membranes with ultrabroadband plasmonic nanofocusing for efficient solar vapour generation", Nature Communications, 6, 10103, 2015.
Lin Zhou, Yingling Tan, Jingyang Wan, Weichao Xu, Ye Yuan, Wenshan Cai, Shining Zhu, and Jia Zhu. "3D self-assembly of aluminium nanoparticles for plasmon-enhanced solar desalination", Nature Photonics, 10, 393-398, 2016.
Lianbin Zhang, Bo Tang, Jinbo Wu, Renyuan Li, and Peng Wang. "Hydrophobic Light-to-Heat Conversion Membranes with Self-Healing Ability for Interfacial Solar Heating", Adv. Mater. 27, 4889-4894, 2015.

* cited by examiner

US 10,611,648 B2

HYBRID HYDROGEL FOR HIGHLY EFFICIENT SOLAR GENERATION OF STEAM

CROSS REFERENCE TO RELATED APPLICATION

This application claims the benefit of U.S. Provisional Application 62/478,678, filed on Mar. 30, 2017, the contents of which are hereby incorporated in its entirety.

FIELD OF THE INVENTION

The invention is directed to materials and methods for efficiently purifying waste and salt water using a hybrid solar energy-harvesting hydrogel.

BACKGROUND

Solar energy is a promising and abundant source to boost the revelation of renewable energy technology. Despite the remarkable resource potential, its unmatched utilization efficiency is an enormous challenge so far. The conversion of the sunlight to thermal energy, has been the subject of both academic researches and industrialization efforts that have accelerated during the past decade. As consequence, the dramatic increases in energy harvesting efficiency and concomitant decreases in the cost enable many practical applications of solar-thermal energy, such as power generation, domestic heating, brine desalination, and energy conversion processes.

Brine desalination based on solar steam generation, in which the solar absorbers are dispersed in water to directly transfer the heat to water facilitating the evaporation, is not only an efficient way for harvesting the solar energy, but also an effective strategy to resolve the crisis of worldwide fresh water shortage. Since the solar radiation (with flux density of ca. 1,000 $W/m^2$, i.e. one sun) serves as the only power input for the steam generation, it requires a highly efficient solar-thermal energy conversion. In this regard, a variety of materials, including ultra-black absorbers, plasmatic nanoparticles and thermal concentrating ceramics have been explored to enhance the solar-thermal energy conversion efficiency. Nevertheless, the large mismatch between the strong energy demand of water vaporization (i.e. specific heat and latent heat) and the inefficient utilization of converted energy poses another challenge. The energy utilized by water evaporation in air/water interface is effective. However, since the solar absorbers dispersed in water serve as heaters, over 70% of the converted energy is consumed to heat bulk water, which can barely accelerate the water vaporization. Therefore, thermal localization, that is, the confinement of heat to small amount of water in air/water interface (i.e. the evaporating surface), has been proposed to significantly improve the utilization efficiency of solar energy based on the optimized harvesting efficiency. As a result of highly concentrated heating, the heat loss during the energy transport from solar absorber to water becomes a serious problem hindering the further development of solar steam generation. Although the introduction of either optical or thermal concentration system can increase the overall utilization efficiency of solar energy, the ideal method is to realize the highly efficient solar steam generation under one sun or even weaker natural daylight.

There remains a need for water purifiers capable of efficiently converting brine or polluted water into potable water. There remains a need for water purifiers that can efficiently operate using solar energy inputs. There remains a need for water purifiers that are simple to operate and do not require expensive or complicated components.

SUMMARY

Disclosed herein are compositions and methods which address one or more of the foregoing needs. In particular are disclosed water purifying materials capable of absorbing water, efficiently converting solar energy to heat, thereby converting the absorbed water to steam and separating it from contaminants and salts. The water purifying hybrid hydrogels can include one or more light absorbing polymers, and one or more water transport polymers.

The details of one or more embodiments are set forth in the descriptions below. Other features, objects, and advantages will be apparent from the description and from the claims.

DETAILED DESCRIPTION

Figure 1:
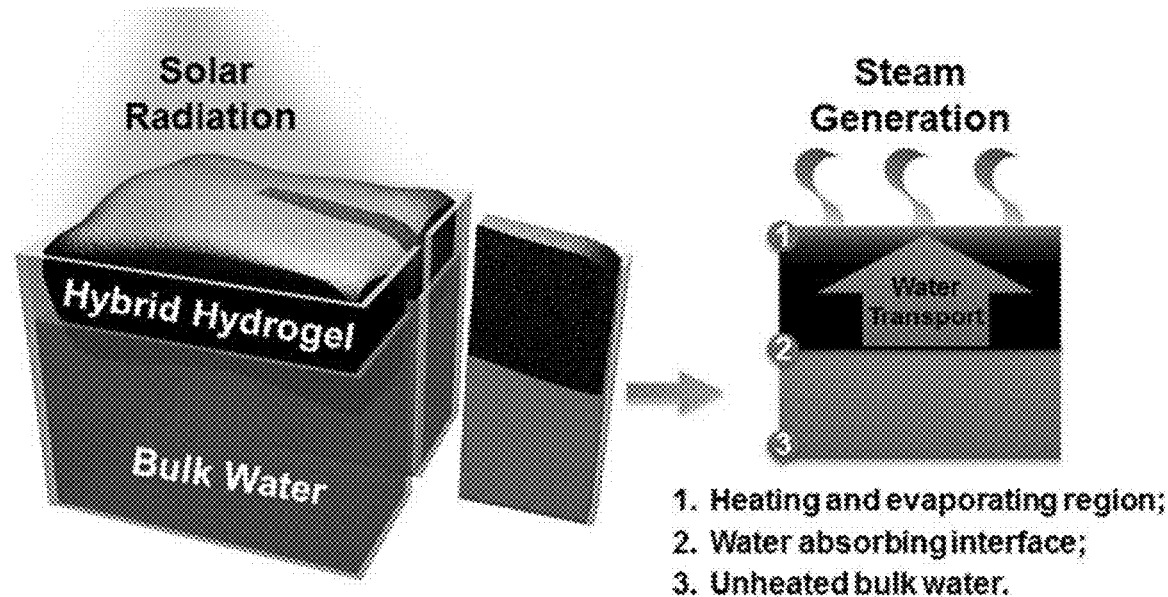
FIG. 1 includes a general depiction of the water purification process using the hybrid hydrogel.
Figure 2:
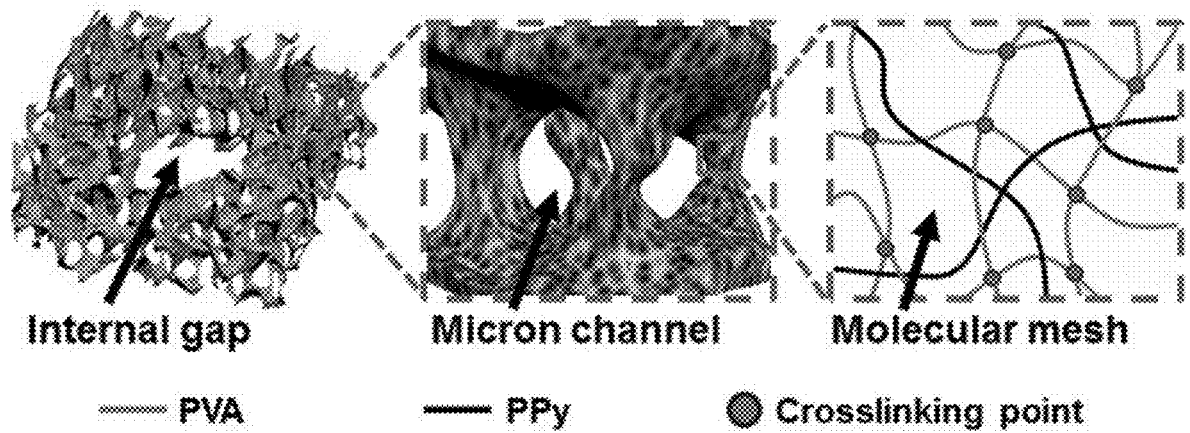
FIG. 2 includes a depiction of the porous structure of hybrid hydrogel.
Figure 3A:
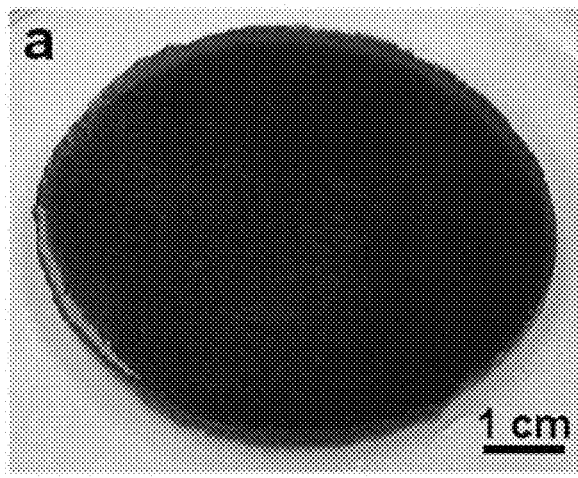
FIGS. 3a, 3b, 3c, and 3d include photographic and microscopic images of the hybrid hydrogel.
Figure 3B:
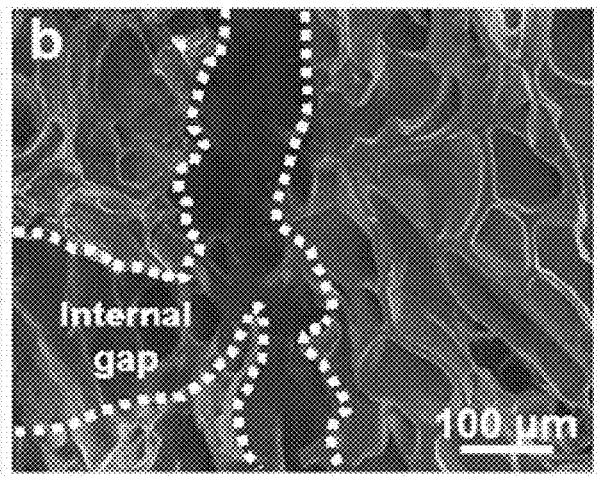
Figure 3C:
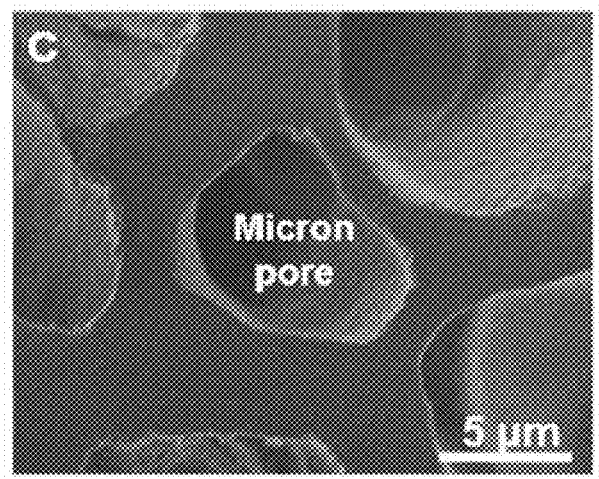
Figure 3D:
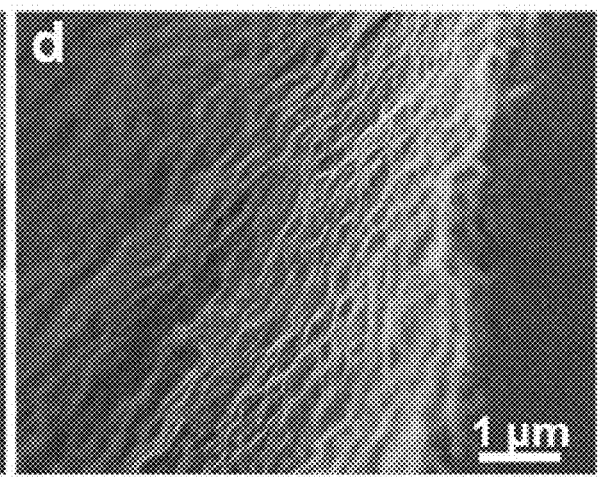
Figure 4:
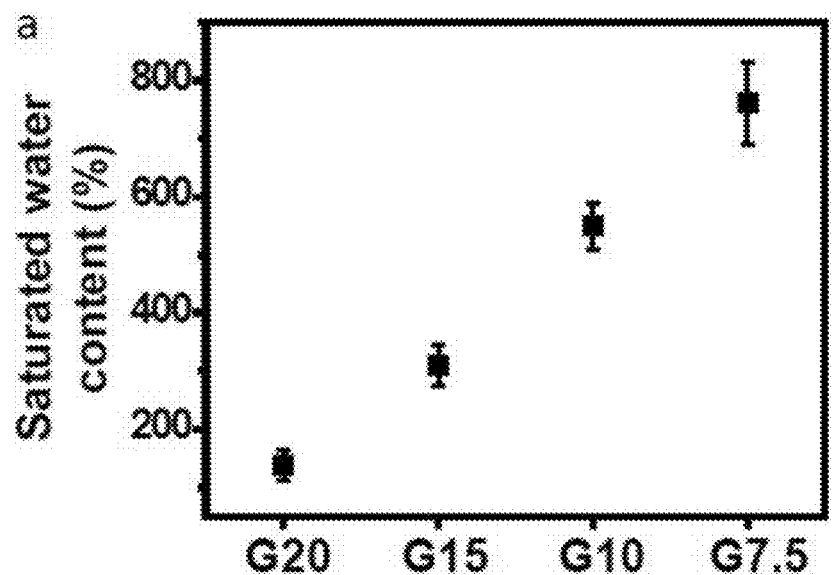
FIGS. 4 and 5 includes a depiction of the water absorptive ability (square data points) and transport properties (circle data points) of various hybrid hydrogels.
Figure 5:
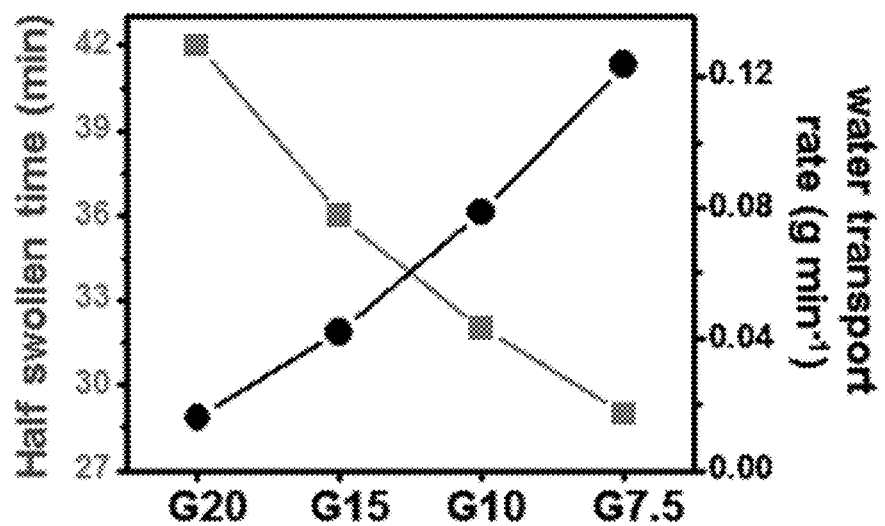
Figure 6:
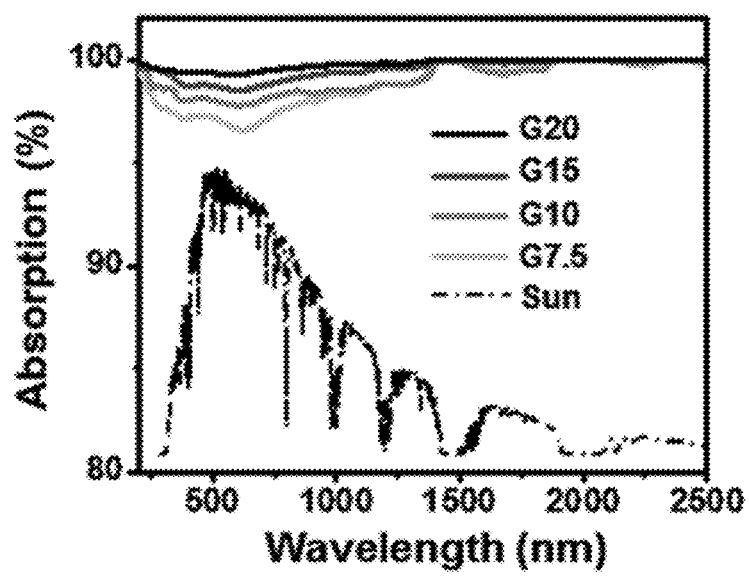
FIG. 6 includes a depiction of the absorbance spectra of various hybrid hydrogels.
Figure 7:
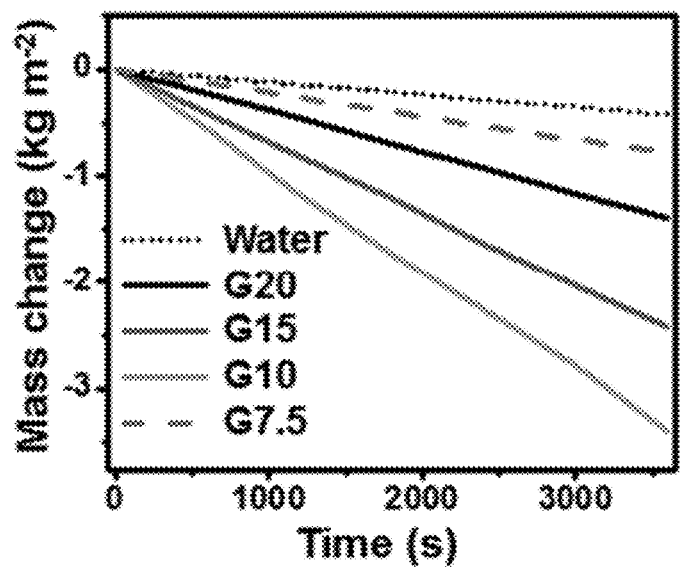
FIG. 7 includes a depiction of the mass change over time of various hydrogels (and water) under irradiation at 1 $kW/m^2$.
Figure 8:
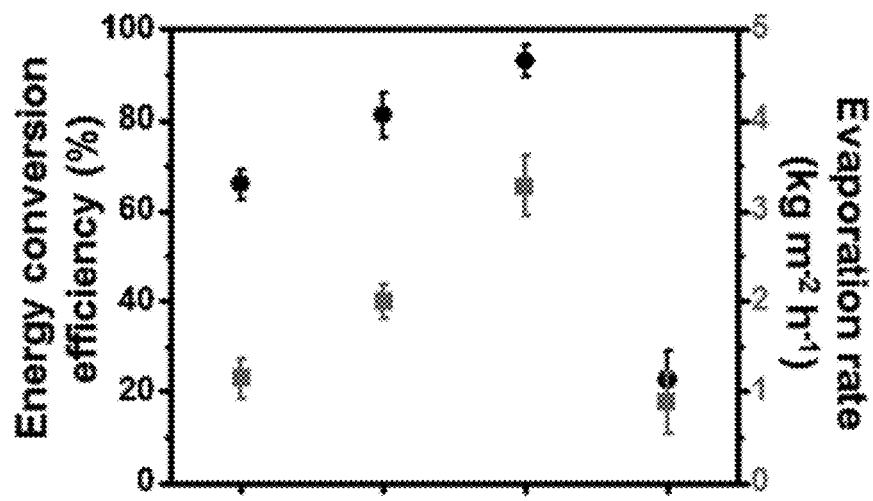
FIG. 8 includes a depiction of the efficiency and water evaporation rate using irradiation at 1 $kW/m^2$ from water-saturated hybrid hydrogels.
Figure 9:
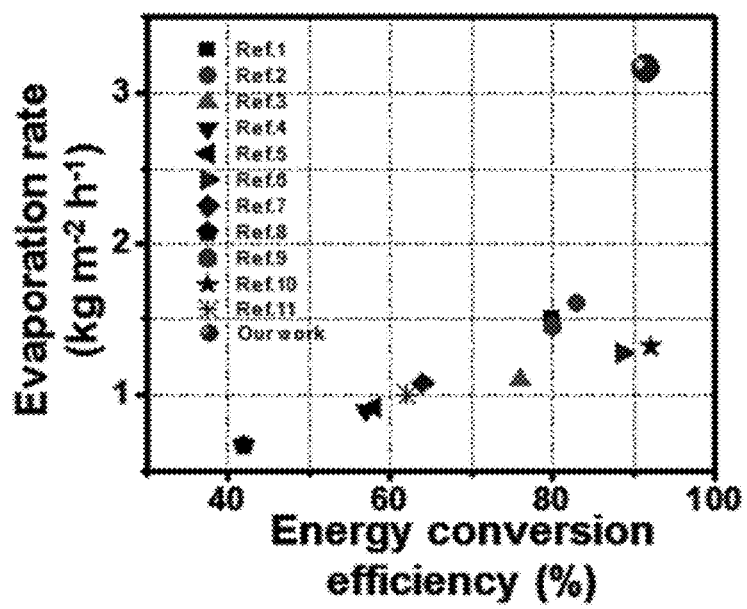
FIG. 9 includes a comparison of the desalinating performance of prior evaporative systems with an exemplary hybrid hydrogel.
Figure 10:
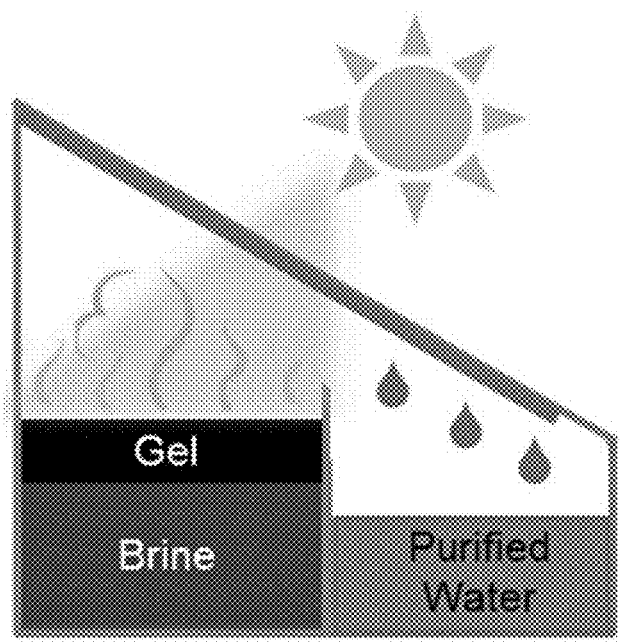
FIG. 10 includes a depiction of an apparatus for converting salt water (brine) into pure water. The apparatus includes a container for holding brine, a condensing surface, a reservoir for purified water, and a hybrid hydrogel positioned between the container and condensing surface.
Figure 11:
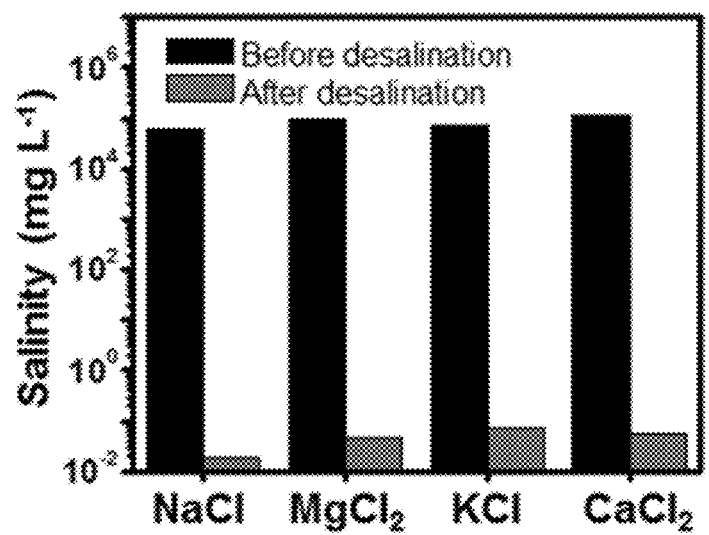
FIG. 11 includes a depiction of the desalination performance of an exemplary hybrid hydrogel.
Figure 12A:
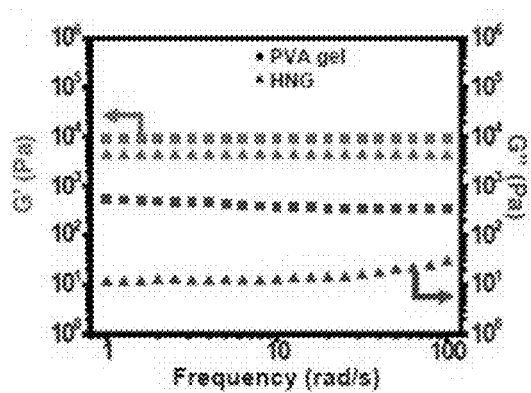
FIG. 12 includes a depiction of the mechanical and chemical properties of the hybrid hydrogel.
Figure 12B:
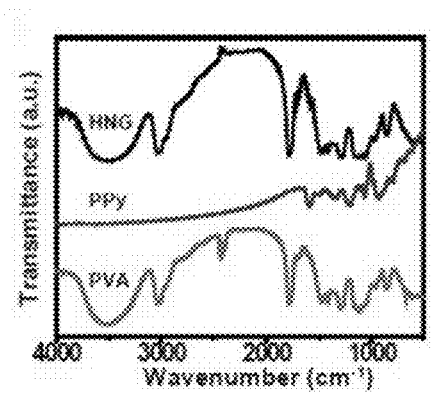
Figure 13:
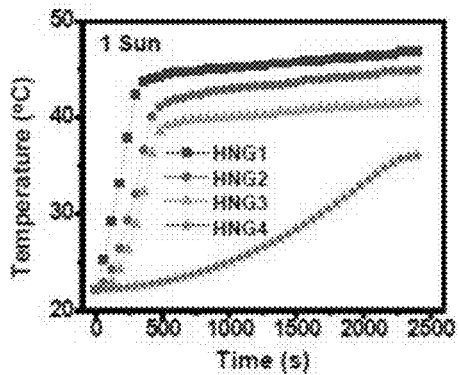
FIG. 13 includes a depiction of the solar heating effect of certain hybrid hydrogels. of the solar heating effect of hybrid hydrogels.
Figure 14:
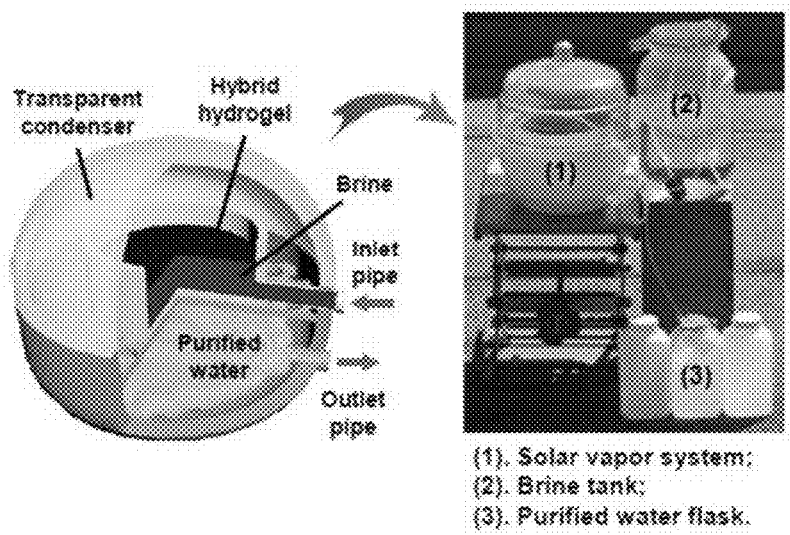
FIG. 14 includes a depiction of an apparatus for converting brine into pure water. The apparatus includes a container for holding brine, a condensing surface, a reservoir for purified water, and a hybrid hydrogel positioned between the container and condensing surface.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes¬ from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The water purifying materials include hybrid hydrogels, which can include interpenetrating networks of light absorbing polymers and water transport polymers. The light absorbing polymers efficiently convert solar irradiation to heat, thereby evaporating the water as it passes through the water transport polymer.

The hybrid hydrogels disclosed herein can absorb many times their own weight in water. For instance, the hybrid hydrogels can absorb at least 200%, at least 300%, at least 400%, at least 500%, at least 600%, at least 700%, at least 800%, at least 900%, or at least 1,000% their weight in water. The hydrogels can rapidly absorb and transport water. The hybrid hydrogels disclosed herein can reach 100% from 50% saturation (by weight) in less than 75 minutes, less than 60 minutes, less than 45 minutes, less than 40 minutes, less than 35 minutes, less than 30 minutes, less than 25 minutes, or less than 20 minutes when submerged in water. Such hybrid hydrogels can be characterized by a water transport rate of at least 0.01 g/min (per 1 g xerogel), at least 0.02 g/min, at least 0.03 g/min, at least 0.04 g/min, at least 0.05 g/min, at least 0.06 g/min, at least 0.07 g/min, at least 0.08 g/min, at least 0.10 g/min, at least 0.12 g/min The average salt content of seawater is about 35,000 mg/L. Water purified using the disclosed hybrid hydrogels can have a final salt content of less than 1 mg/L, less than 0.5 mg/L, less than 0.25 mg/L, or less than 0.1 mg/L.

The hybrid hydrogels disclosed herein exhibit substantially improved solar conversion efficiency, evaporation rate, and desalinating power relative to systems disclosed in the prior art. For instance a sample measuring 1 cm×1 cm×0.5 cm can evaporate at least 0.10 g, at least 0.15 g, at least 0.20 g, at least 0.25 g, at least 0.30 g, at least 0.35 g, at least 0.40 g, or at least 0.50 g of water in a hour when continuously exposed to one solar unit of irradiation (1 kW/m$^2$).

Light absorbing polymer systems include those capable of absorbing electromagnetic radiation, in particular solar radiation. Light absorbing polymers includes those having an energy conversion efficiency of at least 50%, at least 60%, at least 75%, at least 80%, at least 85%, or at least 90%. Light absorbing polymers include those having a mass average molar mass of less than 500,000, less than 450,000, less than 400,000, less than 350,000, less than 300,000, less than 250,000, less than 200,000, less than 175,000, less than 150,000, less than 125,000, less than 100,000, less than 75,000, or less than 50,000.

Exemplary light absorbing polymers include polyheterocycles, for instance polypyrroles, polyanilines, polycarbazoles, polyindoles, polyazepines and copolymers thereof. Copolymers include polymers derived from two or more monomers including pyrroles, anilines, carbazoles, indoles, azepines, acrylic acids, functionalized (meth)acrylates and (meth)acrylamides. The copolymer can be a random copolymer, such as formed when two or more monomers are polymerized together. The copolymer can be a block copolymer, such as when individual monomers are polymerized and subsequently joined together.

In some instances, the light absorbing polymer can include either a doped conductive polymer or a non-doped conductive polymer, or a combination thereof. Doped polymers include polymers that have been oxidized (p-doping) or reduced (n-doping). In some instances, conductive polymers containing basic atoms can be doped under non-redox conditions, for instance by reaction with an acid. Exemplary acids include mineral acids such as hydrochloric acid, hydrobromic acid, hydroiodic acid, sulfuric acid, nitric acid, phosphoric acid, perchloric acid, and tetrafluoroboric acid. Other acids include organic acids such as sulfonic acids (e.g., toluenesulfonic acid, camphorsulfonic acid, benzenesulfonic acid, methanesulfonic acid, and trifluorosulfonic acid), as well as carboxylic acids (e.g., trifluoroacetic acid and trichloroacetic acid). The use of such acids leads to doped polymers including one or more anions, for instance chloride, bromide, iodide, sulfate, phosphate, nitrate, perchlorate, tetrafluoroborate, sulfonate, acetates, and mixtures thereof.

Doped polymers may be characterized by the number of holes per monomer. In some embodiments the doping level is at least 0.010, 0.025, 0.050, 0.075, 0.100, 0.125, 0.150, 0.175, 0.200, 0.225, 0.250, 0.275, 0.300, 0.325, 0.350, 0.375, 0.400, 0.425, 0.450, 0.475, 0.500, 0.525, 0.550, 0.575, 0.600, 0.625, 0.650, 0.675, 0.700, 0.725, 0.750, 0.775, 0.800, 0.825, 0.850, 0.875, 0.900, 0.925, 0.950, or 0.975 holes per monomer. In some embodiments, the doping level can be from 0.010-1.0; from 0.10-1.0; from 0.20-1.0; from 0.30-1.0; from 0.40-1.0; from 0.50-1.0; from 0.60-1.0; from 0.70-1.0; from 0.80-1.0; from 0.90-1.0; from 0.10-0.75; from 0.20-0.75; from 0.30-0.75; from 0.40-0.75; from 0.50-0.75; from 0.10-0.50; from 0.20-0.50; from 0.30-0.50; or from 0.40-0.50.

In certain embodiments, the light absorbing polymer can be a poly(pyrrole), poly(aniline), a mixture thereof, or a copolymer thereof. Exemplary dopants include chloride, bromide, phosphate and tetrafluoroborate. In some embodiments, the light absorbing polymer can have a mass average molar mass of less than 100,000, less than 90,000, less than 80,000, less than 70,000, less than 60,000, or less than 50,000. The light absorbing polymer can have a mass average molar mass from 5,000-100,000, from 10,000-100,000, from 25,000-100,000, from 35,000-100,000, from 50,000-100,000, from 50,000-90,000, from 50,000-80,000, from 50,000-70,000, from 50,000-60,000, from 35,000-50,000, from 35,000-75,000, from 5,000-50,000, from 10,000-50,000, from 20,000-50,000, from 5,000-25,000, from 5,000 to 15,000, or from 5,000-10,000.

In some instances, the water transport polymer can include one or more ionically charged or ionically chargeable polymers. Ionically charged polymers include those that having anionic and/or cationic groups at pH levels common for seawater, e.g., approximately pH 7.5-8.5. Ionically chargeable polymers include those that are electrically neutral at seawater pH but can become ionically charged upon combination with an acid or a base. Suitable charged and chargeable polymers include, for instance, polyacrylic acids, functionalized poly(meth)acrylates and poly(meth)acrylamides such as aminoalkyl (meth)acrylates and (meth)acrylamides.

Water transport polymers include those which can absorb large amounts of water. In some instances the water transport polymer can be a hydrogel. Exemplary water transport polymers include polysaccharides, e.g., xanthan gum, agarose, alginates, sepharose, hyaluronic acid, chitosan, carrageenans, carboxymethylcellulose, polyethylene glycols (PEGs), poly(2-oxazolines), polyacrylamidomethylpropanesulfonate, polycaprolactone (PCL), polyglycolic acid, polyacrylamides (e.g. dimethylacrylamide), polyhydroxyacrylates (e.g. polyhydroxymethacrylate, polyhydroxyacrylamides, polyvinylpyrrolidones), (2-methyl-3-ethyl[2-hydroxyethyl]) polymers, polyhydroxyalkanoates (PHAs), poly(2-methyl-2 oxazolines), poly(2-ethyl-2-oxazolines), poly(2-hydroxyethyl-2-oxazolines), poly(2-(1-(hydroxymethyl)-ethyl)-2-oxazolines), poly-(hydroxyethyl methacrylate) (PHEMA), poly-(hydroxyethyl acrylate) (PHEA), poly vinylpyrrolidone, poly-(dimethyl) acrylamide, poly-(hydroxyethyl)acrylamide, polyvinyl alcohols (including copolymers with vinyl acetates and/or ethylene), poly(ethylene-co-vinyl alcohol), poly(vinyl acetate-co-vinyl alcohol), poly(ethylene-co-vinyl acetate-co-vinyl alcohol), polyethylene glycols and poly(ethylene glycol-co-propylene glycol). In some cases the water transport polymer include gelatin, hypromellose, matrigel, fibrin, fibronectin, collagen and collagen derivatives, sugars, celluloses and modified celluloses such as hydroxypropyl cellulose, hydroxyethyl cellulose. The water transport polymer can be a copolymer (random or block) of any two or more of the above, and can also be a mixture of any two or more of the previously mentioned polymers.

The water transport polymer can be a crosslinked polymer. Crosslinked polymers can be obtained by polymerizing the monomers in the presence of one or more crosslinking monomers, or by reacting formed polymers with crosslinking agents. Many polymers can be covalently crosslinked with aldehydes such as glutaraldehyde, formaldehyde, dialdehyde and the like, with boric acid, or with epoxy compounds. Hydroxyl bearing polymers, like polyvinyl alcohol, or polyethylene glycol, can be partially functionalized with agents like acryloyl chloride, glycidyl methacrylate, allyl ethers, maleimides, vinyl sulfones, NHS esters, or vinyl ethers, and subsequently crosslinked. When the water transport polymer is an (meth)acrylate or (meth)acrylamide based polymer, crosslinking can be achieved polymerizing the monomers in the presence of compounds having two or more vinyl groups. In some instance, the crosslinking monomer will contain two, three, four, five or six vinyl groups. Exemplary crosslinking monomers include alkylene-diol-diacrylates such as ethylene glycol diacrylate and PEG diacrylate, ($C_1$-$C_{10}$alkylene) bisacrylamide, such as N,N-methylenebisacrylamide, N,N-ethylenebisacrylamide, N,N-propylenebisacrylamide, and functionalized acrylamides including mono and di-($C_3$-$C_{10}$alkenyl) acrylamide such as N-allylacrylamide or N,N-diallylacrylamide. The molar ratio of crosslinking monomers to other monomers can be from 1:10,000 to 1:100, from 1:5,000 to 1:100, from 1:2,500 to 1:100, from 1:2,000 to 1:100, from 1:1,500 to 1:100, from 1:1,000 to 1:100, from 1:750 to 1:100, from 1:500 to 1:100, from 1:250 to 1:100, from 1:5,000 to 1:500, from 1:5,000 to 1:1,000, from 1:5,000 to 1:2,500, from 1:5,000 to 1:3,000, from 1:4,000 to 1,1000, from 1:4,000 to 1:2000, from 1:7,500 to 1:2,500, or from 1:10,000 to 1:5,000.

In certain embodiments, the water transport polymer includes a crosslinked polyvinyl alcohol, in which the crosslinker is an aldehyde like glutaraldehyde, or in which the polyvinyl alcohol is derivatized with an (meth)acrylate ester and subsequently crosslinked.

The hybrid hydrogel can be characterized according to the (dry) weight ratio of the light absorbing polymer to water transport polymer. For instance, the ratio of light absorbing polymer to water transport polymer can be from about 1:0.05-1:1, from about 1:0.1-1:1, from about 1:0.25-1:1, from about 1:0.50-1:1, from about 1:0.75-1:1, from about 1:0.05-1:0.75, from about 1:0.1-1:0.75, from about 1:0.25-1:0.75, from about 1:0.50-1:0.75, from about 1:0.05-1:0.50, from about 1:0.10-1:0.50, from about 1:0.25-1:0.50, from about 1:0.25-1:0.75; from about 1:0.05-1:0.25, from about 1:0.10-1:0.25; from about 1:0.05-1:0.20; from about 1:0.05 1:0.15; from about 1:0.05-1:0.10; from about 1:0.10-1:0.20; or from about 1:0.10-1:0.15.

In some embodiments, the hybrid hydrogel can contain the water transport polymer in an amount (calculated based on the dry weight) from about 1-20 wt %, from about 2.5-20 wt %, from about 5-20 wt %, from about 1-15 wt %, from about 2.5-15 wt %, from about 5-15 wt %, from about 7.5-20 wt %, from about 7.5-15 wt %, from about 7.5-12.5 wt %, from about 10-20 wt %, from about 12.5-20 wt %, or from about 15-20 wt %.

The water purifying materials can include additional light absorbing materials, for instance metal nanoparticles such as Au, Al, Ag, metal oxide particles such as $TiO_2$, ZnO, $Fe_3O_4$, and carbonaceous materials such as graphite, graphene, graphene oxide, carbon nanotubes and the like.

The water purifying networks can be prepared by polymerizing one component of the network in the presence of the already formed polymer of the other component. For instance, monomer precursors of the water transport polymer can be combined with a light absorbing polymer, and then subjected the conditions suitable to form the water transport polymer. In other embodiments, monomer precursors of the light absorbing polymer can be combined with a water transport polymer, and then subjected the conditions suitable to form the light absorbing polymer. In other embodiments, the light absorbing polymer can be combined with a hydrophilic polymer, and then subjected to conditions sufficient to crosslink the hydrophilic polymer to obtain the hybrid hydrogel.

Also disclosed herein are water purifying systems including the hybrid hydrogel, and methods of purifying water using the hybrid hydrogel. Typically, such a system will includes a container for holding water feedstock (i.e., brine or polluted water), a condensing surface, a receiving vessel for purified water, and a hybrid hydrogel disposed between the container and condensing segment. The hybrid hydrogel can be in direct contact with the water feedstock, for instance, floating directly on top of it. The hybrid hydrogel is disposed so that it is exposed to sunlight, thereby heating the water drawn into the hydrogel network where it is vaporized. The condensing surface is disposed so that the generated steam contacts the surface, where it is condensed and transported to the reservoir, usually via a combination of cohesive and adhesive forces and gravity.

EXAMPLES

The following examples are set forth below to illustrate the methods and results according to the disclosed subject matter. These examples are not intended to be inclusive of all aspects of the subject matter disclosed herein, but rather to illustrate representative methods, compositions, and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures, and other reaction ranges and conditions that can be used to optimize the product purity and yield obtained from the described process. Only reasonable and routine experimentation will be required to optimize such process conditions.

Example 1: Preparation of a Hybrid Hydrogel

Ammonium persulfate (98%, SigmaAldrich, 0.228 g (1 mmol)) was dissolved in 10 mL deionized (DI) water, and labelled as solution A. Pyrrole (99%, SigmaAldrich, 0.069 mL) was mixed into 10 mL DI water and labelled as solution B. Solution A and B were added dropwise to 50 mL 1.2 M HCl aqueous solution under magnetic stirrer mixing. The mixture was allowed to stir for five minutes, after which the formed polymer was separated by filtration and washing. Then PPy was well dispersed in DI water by sonication to form PPy solution. PVA (1 g, MW 15,000), glutaraldehyde (125 uL, 50% wt in DI water) and DI water (10 mL) were mixed together by sonication (Solution C). HCl (50 uL 1.2 M) and PPy solution (100 uL, 5% wt) were added. After two hours, the obtained PVA hydrogel was immersed into DI water overnight to remove unreacted monomers.

Example 2: Evaluation of Hybrid Hydrogel

The obtained hydrogel was set on the surface of brine and exposed to the solar radiation. The mass loss of the whole water system including container, brine and hydrogel was recorded.

| Sample | PVA | glutaraldehyde | HCl | PPy (50% $_{wt}$) | DI water | Size (cm) |
|---|---|---|---|---|---|---|
| G7.5 | 0.75 g | 93.75 uL | 50 uL | 100 uL | 10 mL | 1*1*0.5 |
| G10 | 1 g | 125 uL | 50 uL | 100 uL | 10 mL | 1*1*0.5 |
| G15 | 1.5 g | 187.5 uL | 50 uL | 100 uL | 10 mL | 1*1*0.5 |
| G20 | 2 g | 250 uL | 50 uL | 100 uL | 10 mL | 1*1*0.5 |

Sample G7.5 may also be designated NHG4, sample G10 may also be designated NHG3, sample G15 may also be designated NHG2, and sample G20 may also be designated NHG1.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. A water purifying material comprising an interpenetrating network comprising:
   a) a light absorbing polymer; and
   b) a water transport polymer,
   wherein the water transport polymer comprises crosslinked polyvinyl alcohol, carboxymethyl cellulose or a salt thereof, carboxymethyl starch or a salt thereof, or a mixture thereof.

2. The network of claim 1, wherein the light absorbing polymer comprises a polypyrrole, polyaniline, polycarbazole, polyindole, polyazepine or a copolymer thereof.

3. The network of claim 1, wherein the light absorbing polymer comprises a dopant.

4. The network of claim 3, wherein the dopant comprises perchlorate ion, halide ion, sulfonate ion, phosphate ion, borate ion, nitrate ion, sulfate ion, acetate ion or a mixture thereof.

5. The network of claim 4, wherein the dopant comprises chloride ion, bromide ion, phosphate ion, tetrafluoroborate ion, or a mixture thereof.

6. The network of claim 4, wherein the dopant is present at a doping level of at least 0.200 holes per monomer.

7. The network of claim 1, wherein the light absorbing polymer has a Mw less than about 250,000 Da.

8. The network of claim 1, wherein the water transport polymer comprises a hydrophilic polymer.

9. The network any of claim 1, wherein the dry weight ratio of light absorbing polymer to water transport polymer is from about 1:0.05-1:0.25.

10. A method of making the network of claim 1, comprising crosslinking a water-transport polymer in the presence of a light absorbing polymer.

11. A method of making the network of claim 1, comprising polymerizing light absorbing polymer-precursor monomers in the presence of a water-transport polymer.

12. The method of claim 11, wherein the water-transport polymer comprises a crosslinked water-transport polymer.

13. A method of making the network of claim 1, comprising polymerizing water-transport polymer precursor monomers in the presence of a light absorbing polymer.

14. The method of claim 13, further comprising crosslinking the water-transport polymer.

15. A method of purifying water comprising contacting water with a water purifying material comprising an interpenetrating network comprising:
   i) a light absorbing polymer; and
   ii) a water transport polymer
under conditions sufficient to convert the water to steam and condensing the steam to provide purified water.

16. An apparatus for purifying water, comprising
   a) a brine container;
   b) a water purifying material comprising an interpenetrating network comprising:
      i) a light absorbing polymer; and
      ii) a water transport polymer;
   c) a pure water reservoir; and
   d) a condensing surface;
wherein the interpenetrating network is disposed between the brine container and condensing surface, and the condensing surface is in fluid communication with the pure water reservoir.

* * * * *